United States Patent
Rehal et al.

(10) Patent No.: US 11,573,987 B2
(45) Date of Patent: Feb. 7, 2023

(54) SYSTEM FOR DETECTING DATA RELATIONSHIPS BASED ON SAMPLE DATA

(71) Applicant: Hitachi Vantara LLC, Santa Clara, CA (US)

(72) Inventors: Daljit Rehal, Coulsdon (GB); Terry Phipps, Windsor (GB); Emmanuel Olajide, Windsor (GB); Graham Ross, Windsor (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 31 days.

(21) Appl. No.: 16/645,212

(22) PCT Filed: Sep. 7, 2018

(86) PCT No.: PCT/GB2018/052553
§ 371 (c)(1),
(2) Date: Mar. 6, 2020

(87) PCT Pub. No.: WO2019/048879
PCT Pub. Date: Mar. 14, 2019

(65) Prior Publication Data
US 2020/0293559 A1    Sep. 17, 2020

(30) Foreign Application Priority Data
Sep. 8, 2017  (GB) ...................... 1714501

(51) Int. Cl.
*G06F 16/28*    (2019.01)
*G06F 16/242*   (2019.01)
*G06F 16/2455*  (2019.01)

(52) U.S. Cl.
CPC ........ *G06F 16/288* (2019.01); *G06F 16/2423* (2019.01); *G06F 16/2428* (2019.01); *G06F 16/2456* (2019.01); *G06F 16/289* (2019.01)

(58) Field of Classification Search
CPC .. G06F 16/288; G06F 16/289; G06F 16/2428; G06F 16/2456; G06F 16/2423;
(Continued)

(56) References Cited

U.S. PATENT DOCUMENTS 8,788,405 B1    7/2014  Sprague et al.
9,202,249 B1 *  12/2015 Cohen .................... G06Q 40/12
(Continued)

OTHER PUBLICATIONS

Great Britain Search Report for GB Application No. 1714501.2 dated Jan. 31, 2018, 4 pages.
(Continued)

*Primary Examiner* — Aleksandr Kerzhner
*Assistant Examiner* — Fernando M Mari Valcarcel
(74) *Attorney, Agent, or Firm* — Mattingly & Malur, PC

(57) ABSTRACT

A method of identifying relationships between data collections is disclosed. Each data collection comprises a plurality of data records made up of data fields. The method comprises performing a relationship search process based on a first seed value and a second seed value. A first set of records from the data collections is identified based on the first seed value. A second set of records from the data collections is identified based on the second seed value. The process then searches for a common value across the first and second record sets, wherein the common value is a value which appears in a first field in a first record of the first record set and in a second field in a second record of the second record set, wherein the first record is from a first data collection and the second record is from a second data collection. In response to identifying the common value, an indication is output identifying a candidate relationship between the first field of the first data collection and the second field of the second data collection.

16 Claims, 11 Drawing Sheets

(58) Field of Classification Search
CPC .... G06F 16/215; G06F 16/258; G06F 16/285; G06F 16/211
See application file for complete search history.

(56) References Cited

U.S. PATENT DOCUMENTS

| | | | |
|---|---|---|---|
| 9,684,705 B1* | 6/2017 | Satish | G06F 16/358 |
| 2006/0074901 A1* | 4/2006 | Pirahesh | G06F 16/24544 |
| | | | 707/999.005 |
| 2008/0320012 A1 | 12/2008 | Loving et al. | |
| 2009/0187596 A1 | 7/2009 | Akiyama et al. | |
| 2011/0178974 A1 | 7/2011 | Mehmet et al. | |
| 2013/0246449 A1 | 9/2013 | Balannik et al. | |
| 2014/0012886 A1* | 1/2014 | Downing | G06F 16/211 |
| | | | 707/805 |
| 2016/0055233 A1* | 2/2016 | Wang | G06F 16/288 |
| | | | 707/756 |
| 2016/0063042 A1* | 3/2016 | Noma | G06F 16/2228 |
| | | | 707/737 |
| 2016/0092552 A1* | 3/2016 | Morfonios | G06F 16/23 |
| | | | 707/737 |
| 2017/0236032 A1* | 8/2017 | Lin | G06K 9/6262 |
| | | | 382/159 |

OTHER PUBLICATIONS

Great Britain Search Report for GB Application No. 1714501.2 dated May 30, 2018, 2 pages.
PCT International Search Report and The Written Opinion of the International Searching Authority for corresponding International Application No. PCT/GB2018/052553, dated Oct. 25, 2019, 14 pages.

* cited by examiner

| Value | Location(s) |
|---|---|
| Daljit | [(T1,C2,R1), (T1,C2,R4),(T4,C2,R3),(T4,C2,R4)] |
| Shoe | [(T3,C4,R7)] |

Fig. 6A

| Value | Location(s) | Full rows |
|---|---|---|
| Daljit | [(T1,C2,R1), (T1,C2,R4), (T4,C2,R3), (T4,C2,R4)] | [T1,R1,(C1,"CustKEY1",C2,"Daljit",C3,"Rehal",C4,"10/10/1979",C5,"AddrKEY1")], [T1,R4,(C1,"CustKEY4",C2,"Daljit",C3,"Phipps",C4,"01/12/1989",C5,"AddrKEY4")], [T4,R3,(C1,"BillKEY3",C2,"Daljit",C3,"Phipps",C4,"99")], [T4,R4,(C1,"BillKEY4",C2,"Daljit",C3,"Rehal",C4,"22")] |
| Shoe | [(T3,C4,R7)] | [T3,R7,(C1,"OrderKEY7",C2,"CustKEY1",C3,"05/10/2016",C4,"Shoe",C5,"15")] |

Fig. 6B

| | CustKEY1 | Rehal | 10/10/1979 | AddrKEY1 | CustKEY4 | Phipps | 10/12/1989 | AddrKEY4 | ... |
|---|---|---|---|---|---|---|---|---|---|
| Daljit | T1,C1,R1 | T1,C3,R1 | T1,C4,R1 | T1,C5,R1 | T1,C1,R4 | T1,C3,R4 | T1,C4,R4 | T1,C5,R4 | ... |
| | OrderKEY7 | CustKEY1 | 05/10/2016 | 15 | | | | | |
| Shoe | T3,C1,R7 | T3,C2,R7 | T3,C3,R7 | T3,C5,R7 | | | | | |

Fig. 6C

| Table | Column 1 | Column 2 | Column 3 | Column 4 | Column 5 | Column 6 |
|---|---|---|---|---|---|---|
| Customer | CustKEY1 | Daljit | Rehal | 10/10/19 | AddrKEY1 | |
| | CustKEY2 | Graham | Ross | 05/03/1974 | AddrKEY2 | |
| | CustKEY3 | Terry | Phipps | 03/03/1981 | AddrKEY3 | |
| | CustKEY4 | Daljit | Phipps | 01/12/1989 | AddrKEY4 | |
| | CustKEY5 | Terry | Ross | 01/04/1974 | AddrKEY5 | |
| Address | AddrKEY1 | Rose Cottage | Swamp Road | Hackney | London | N 2AA |
| | AddrKEY2 | Sparky Villa | Electric Avenue | Brixton | London | SW1 3AB |
| | AddrKEY3 | Orbis 1 | Lost Road | Staines | Surrey | TW18 3AR |
| | AddrKEY4 | Flat 2 | 2 High Street | Staines | Surrey | TW18 3AR |
| | AddrKEY5 | | Burnley Park | Hawkshead | Cumbria | CU5 7RD |
| | AddrKEY6 | | 78 Love Lane | Matlock | Derbyshire | DE11 7YY |
| Order | OrderKEY1 | CustKEY2 | 29/09/2016 | Table | 10 | |
| | OrderKEY2 | CustKEY3 | 30/09/2016 | Chair | 30 | |
| | OrderKEY3 | CustKEY3 | 01/10/2016 | Lamp | 25 | |
| | OrderKEY4 | CustKEY5 | 02/10/2016 | Charger | 16 | |
| | OrderKEY5 | CustKEY5 | 03/10/2016 | Bulb | 12 | |
| | OrderKEY6 | CustKEY5 | 04/10/2016 | Thermostat | 22 | |
| | OrderKEY7 | CustKEY1 | 05/10/2016 | Shoe | 15 | |
| | OrderKEY8 | CustKEY1 | 06/10/2016 | Socks | 7 | |
| | OrderKEY9 | CustKEY4 | 07/10/2016 | TV | 99 | |
| Bill | BillKEY1 | Graham | Ross | 10 | | |
| | BillKEY2 | Terry | Phipps | 55 | | |
| | BillKEY3 | Daljit | Phipps | 99 | | |
| | BillKEY4 | Daljit | Rehal | 22 | | |
| | BillKEY5 | Terry | Ross | 50 | | |

Fig. 7A

Order Table

| Item | Quantity | Delivery postcode |
|------|----------|-------------------|
| 1234 | 1 | SW19 5BR |
| 4545 | 1 | BB22 2ZB |
| 7654 | 3 | RG21 4PX |
| 9999 | 10 | TN7 0GR |
| ... | | |

Address table

| Name | Street | Postcode |
|------|--------|----------|
| Jennie Green | Market Street | TN7 0GR |
| John Smith | Second Street | AA11 1IA |
| Paul Jones | High Street | RG21 4PX |
| Joe Bloggs | Main Street | SW19 5BR |
| ... | | |

Fig. 7B

Order Table

| Item | Quantity | Delivery postcode |
|------|----------|-------------------|
| 1234 | 1 | SW19 5BR |
| 4545 | 1 | BB22 2ZB |
| 7654 | 3 | SW19 5BR |
| 9999 | 10 | SW19 5BR |
| ... | | |

Address table

| Name | Street | Postcode |
|------|--------|----------|
| Jennie Green | Market Street | TN7 0GR |
| John Smith | Second Street | AA11 1IA |
| Paul Jones | High Street | RG21 4PX |
| Joe Bloggs | Main Street | SW19 5BR |
| ... | | |

Fig. 7C

SYSTEM FOR DETECTING DATA RELATIONSHIPS BASED ON SAMPLE DATA

CROSS-REFERENCE TO RELATED APPLICATIONS

This application is a national phase application of International Application No PCT/GB2018/052553, filed Sep. 7, 2018, which claims priority to Great Britain Patent Application Serial No. 1714501.2, filed Sep. 8, 2017, all of which are incorporated herein by reference.

BACKGROUND

The present invention relates to systems and methods for analysing data sets to identify possible data relationships in the data sets that can be used, for example, to support creation and execution of queries on the data sets.

Relationships between different data collections, such as between different data tables in a relational database, are often defined by a database designer during creation of a database (e.g. as primary key to foreign key relationships) and are typically reflected in the design of queries and views that provide efficient access to specific data in the database. However, when data is exported from the original database to some other data repository (e.g. in order to bring together data from multiple disparate sources), structural information such as data relationships is often lost. This makes efficient querying of the data difficult. Furthermore, data originating from different sources may be interrelated without explicit relationships having been defined. Identifying relationships without access to original design data represents significant challenges, with past approaches to the problem often being computationally highly intensive.

SUMMARY

Embodiments of the present invention accordingly seek to address deficiencies in prior approaches and/or provide alternatives to those approaches.

Accordingly, in a first aspect of the invention, there is provided a method of identifying relationships between given data collections of a plurality of data collections, each data collection comprising a plurality of data records, each data record comprising one or more data fields storing one or more data values, the method comprising performing a search process including: receiving a first seed value and a second seed value; identifying a first set of records from the plurality of data collections based on the first seed value; identifying a second set of records from the plurality of data collections based on the second seed value; searching for a common value across the first and second record sets, wherein the common value is a value which appears in a first field in a first record of the first record set and in a second field in a second record of the second record set, preferably wherein the first record is from a first data collection and the second record is from a second data collection; and in response to identifying the common value, outputting (and/or storing) an indication identifying a candidate relationship between the first field of the first data collection and the second field of the second data collection.

This approach allows seed values (e.g. known data) to be used to guide the search for relationships, reducing the processing burden compared to approaches based on exhaustive analysis of data sets. Data collections may e.g. correspond to data tables or other data structures storing data as records/rows made up of fields/attributes, or using other analogous structures.

Identifying the first record set preferably comprises identifying one or more records containing the first seed value. Identifying the second record set preferably comprises identifying one or more records containing the second seed value. The search for a common value is preferably performed using the identified records.

Preferably, the method comprises, in response to not identifying the common value when searching using the identified records, adding one or more records to either or both of the first and second record sets, and repeating the search for a common value using the added records. This allows the search to be expanded to related records (possibly in other data collections, e.g. tables), to allow relationships been data collections to be found even where the seed values do not directly allow related records to be identified. The search for a common value may be repeated using all records of the given record set including the added records and previously identified records or using only newly added records.

Adding records to a given record set preferably comprises: identifying one or more further values, preferably not including the respective first or second seed value, which appear in records of the given record set; and selecting one or more records to be added to the given record set based on the further value(s). The added records may be selected from any of the plurality of data collections and thus may be from the same or different data collections as the original records of the record set. Selecting one or more records to be added preferably comprises selecting one or more records from the plurality of data collections that include one of the further values.

Preferably, the identifying step identifies as the further values each distinct value appearing in the given record set other than the respective seed value. The selecting step may select every record from the data collections not already included in the record set that contains any of the identified further values.

The method may comprise performing the adding step for the first record set and repeating the searching step using the added records, and subsequently, if a common value is not identified, performing the adding step for the second record set and repeating the searching step using the records added to the first and second record sets.

The method may comprise, if no common value is identified, performing one or more further iterations of the steps of (a) adding records to one or more of the record sets and (b) repeating the searching step using the added records, until a common value is found or a termination criterion is met. The termination criterion may specify a maximum number of iterations.

Identifying one or more records based on a seed value or based on a further value preferably comprises performing a lookup of the seed value or further value in a value index, the value index mapping data values appearing in the plurality of data collections to locations where the data values appear, each location preferably comprising a reference to the data collection, record and field where a respective data value appears. The method may comprise generating the value index based on the data collections.

Preferably, the method comprises repeating the search process based on a plurality of training samples, each training sample comprising respective first and second seed values, to produce a plurality of indications of candidate data relationships, each indication indicating a potential relationship between a first field of a first data collection and a second field of a second data collection. The method preferably comprises analysing the plurality of indications to identify one or more probable data relationships. A "probable" data relationship may be a relationship having a high probability of representing a true relationship, based on some criterion indicative of the probability or strength of the relationship.

The method may comprise accumulating information about data relationships during the repeating of the search process and identifying one or more probable data relationships based on the accumulated information. Alternatively or additionally, the step of outputting the indications may comprise storing the indications, the method comprising processing the plurality of stored indications to identify one or more probable data relationships.

The method may comprise identifying a plurality of distinct candidate relationships, wherein a distinct candidate relationship is preferably a relationship between a given first field of a first data collection and a given second field of a second collection, and determining a measure indicative of a strength or likelihood of each distinct candidate relationship based on the analysis. The method may comprise determining the measure for a candidate relationship in dependence on a number of distinct occurrences of the relationship found during the search process. In doing so, multiple occurrences of the relationship with the same common value may be counted as a single distinct occurrence, or multiple occurrences with the same common value may be counted as multiple distinct occurrences.

The method may comprise, for each distinct candidate relationship identified between a first field of a first data collection and a second field of a second data collection based on one or more common values, determining one or both of: a first number, being a number of times the distinct candidate relationship was identified using the search process; and a second number, being a number of distinct values of the common values used to identify multiple instances of the candidate relationship; and determining the measure for the candidate relationship based on the first and/or second number.

The method may comprise determining the measure based on a ratio of the first number or the second number, and a total number of training samples processed.

Preferably, one or more of the distinct candidate relationships are selected as probable relationships based on the respective measures. Preferably, the method comprises outputting information specifying the selected probable relationships. The one or more relationships may be selected in dependence on a comparison of the measure computed for the candidate relationship and a threshold and/or by selecting a given number of relationships having a highest strength or likelihood according to the computed measures.

Optionally, the method may comprise using one or more identified candidate relationships or probable relationships in the creation of a query. The method may comprise receiving, by a query design tool, a selection of at least two data collections for a query, and adding a join to the query based on a candidate relationship identified by the search process and/or a candidate relationship selected as a probable relationship. The method may comprise outputting one or more relationships identified as probable relationships to a user, receiving a selection of one of the relationships, and adding a join to the query design based on the selected relationship. A relationship used for the query is preferably defined between a first field of a first data collection and a second field of a second data collection, the method comprising adding a join predicate to the query specifying an equivalence or other relationship between the first field and the second field.

In one embodiment, the data collections are associated with a data processing system comprising a data input interface, and the method comprises: inputting sample data to the data processing system via the data input interface, whereby the data processing system stores the sample data into a source database, and wherein the data collections form part of the source database or are copied from corresponding data collections of the source database; and running the search process to identify data relationships based on the sample data. Values from the sample data are preferably used as the seed values for the search process.

The method may comprise importing the data collections from one or more source databases into a data repository, with the method operating on the imported data collections.

The data collections may be, or include, data tables, optionally in or imported from one or more relational databases, wherein the records correspond to rows of the tables, and wherein the fields correspond to columns of the tables. Alternatively or additionally, the data collections may be, or include, object collections, typically corresponding to object classes, optionally in or imported from one or more object-oriented databases, wherein the records correspond to objects of the object collections, and wherein the fields correspond to data attributes of the objects. The data collections may include data structured in accordance with any data structuring paradigm, and furthermore may combine differently structured data collections; for example the plurality of data collections may include both relational database tables and object collections.

The method may comprise processing multiple training samples in parallel by parallel instances of the search process. The search process may be implemented as a parallelized map-reduce algorithm.

In a further aspect of the invention, there is provided a method of identifying aspects of a data schema of a database, the database associated with a data processing system having a data input interface, the data processing system adapted to store data input via the data input interface in the database, the method comprising: inputting sample data to the data processing system using the data input interface, whereby the data processing system stores the sample data in the database in accordance with the data schema; and analysing data from the database based on the sample data to identify one or more relationships between data collections of the database. Analysing data may comprise importing one or more data collections from the database into a data repository and analysing the imported data. Preferably, analysing data comprises using values from the sample data as seed values for a relationship search, the relationship search preferably comprising performing a method as set out in the first aspect of the invention or as described elsewhere herein.

In this way, known data ingested into a system that uses an unknown data schema can be used to probe that data schema. Preferably, the method is performed by a system separate from the data processing system, and with no access to or control over the way in which the data processing system handles and stores the sample data.

The invention also provides a system or apparatus having means, preferably in the form of a processor with associated memory, for performing any method as set out herein, and a tangible/non-transitory computer-readable medium comprising software code adapted, when executed on a data processing apparatus, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIGS. 6A-6C show a worked example of the operation of the relationship discovery;

FIG. 7A illustrates a relationship search involving more than two tables;

FIGS. 7B-7C illustrate identification of multiple instances of the same candidate relationship;

DETAILED DESCRIPTION

Embodiments of the invention provide systems and methods for discovering relationships between data collections. In preferred embodiments, the data collections are in the form of data tables that have been imported from one or more sources into a single data repository. The system provides a relationship discovery module that searches for relationships between the tables. Such relationships may include relationships that were defined explicitly in the original database schemas of the databases where the tables originated, but that have been lost during importing of data. Relationships may also include relationships that are inherent in the data but were never explicitly defined, for example in the case of tables originating from different source databases.

Figure 1:
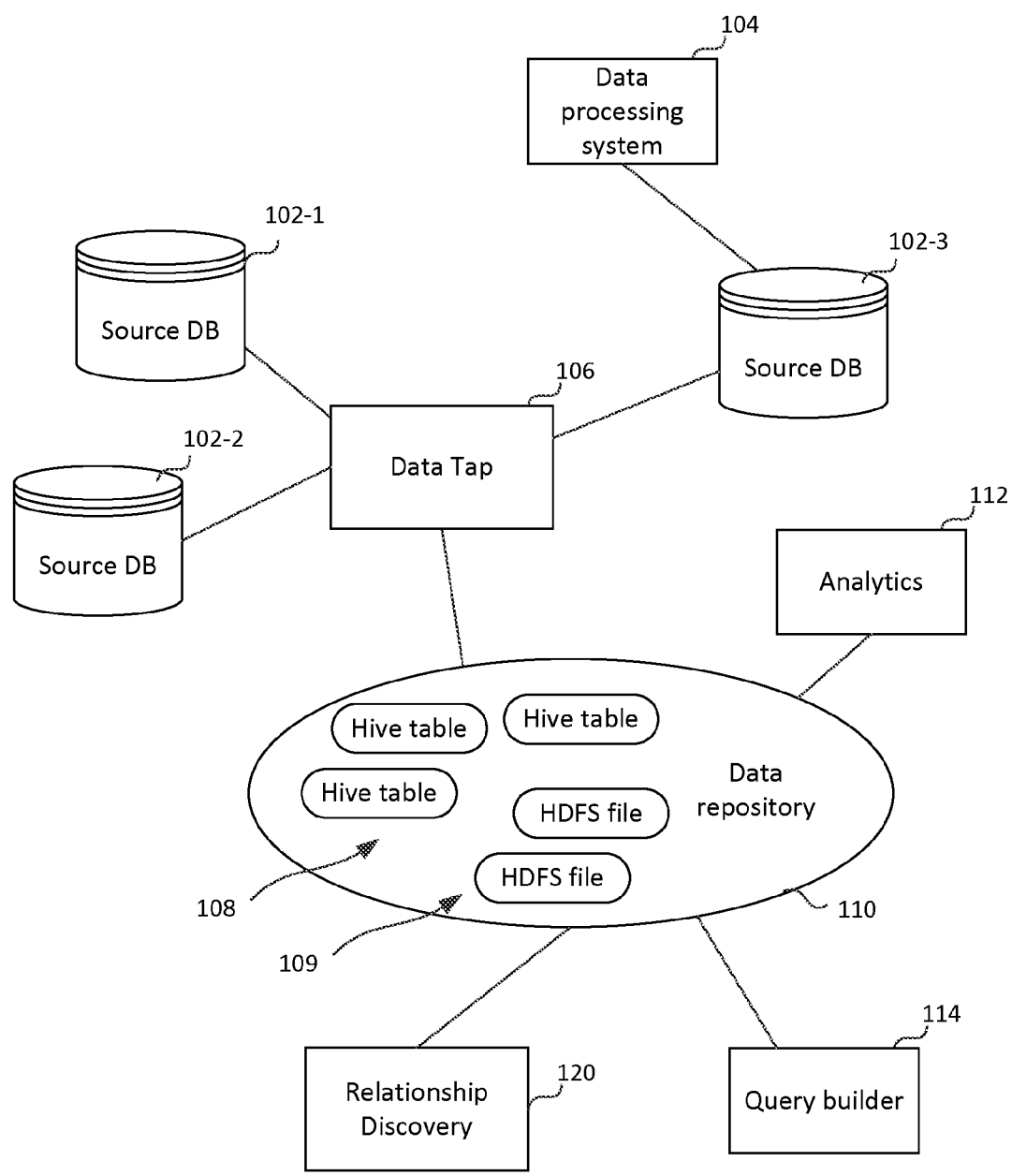
FIG. 1 illustrates a data management system in which a relationship discovery module according to embodiments of the invention may be implemented.

A data processing system in which embodiments of the invention may be used is shown in overview in FIG. 1.

It should be noted that, in the following description, specific implementation details are set out by way of example (for example in relation to database and software technologies used and details of the software architecture of the system—e.g. the use of Hadoop/Hive technologies). These relate to an exemplary implementation of the system but should not be construed as limiting, and alternative approaches and technologies may be substituted.

As depicted in FIG. 1, the data processing system comprises a central data repository 110, which may also be referred to herein as a "data lake", and may comprise any data storage technology. Preferably, the data lake allows data to be stored in an unstructured or flexibly structured manner. For example, the repository or data lake may not require a fixed or pre-defined data schema. The data lake may be (or may include) a NoSQL or other non-relational database, such as a document-oriented database storing data as "document" data objects (e.g. JSON documents), a key-value store, a column-oriented database, a file system storing flat files, or any other suitable data store or combination of any of the above. However, in other embodiments, the data lake could alternatively include a conventional structured database such as a relational database or object database.

In the examples described herein, the data lake is implemented as a Hadoop data repository employing a Hadoop Distributed File System (HDFS) with an Apache Hive data warehousing infrastructure. Hive Query Language (HQL) is used to create and manipulate data sets in the HDFS to store data extracted from the data sources 102.

The data processing system provides a software component referred to as the "Data Tap" tool 106 for importing data from any number of data sources 102-1, 102-2, 102-3 into the data repository 110.

The data sources 102-1, 102-2, 102-3 are typically structured databases (e.g. relational or object databases) but any form of data source may be used, such as flat files, real-time data feeds, and the like. In the following examples, the data sources are relational databases managed by conventional relational database management systems (RDBMS), e.g. Oracle/MySQL/Microsoft SQL Server or the like.

A given source database 102 consists of a number of tables (where a table comprises a set of rows or records, each divided into one or more fields or columns). The Data Tap tool may import a database in its entirety (i.e. including all tables) or alternatively may import only one or more selected tables. Furthermore, the system may import tables and data from a single data source 102 or from multiple data sources into the same data repository 110. Thus, data that originated from differently structured data sources having different original data schemas may coexist within data repository 110 in the form of a collection of Hive tables 108. Other data (e.g. imported from other sources) may also exist in the repository 110 as flat files, in the form of HDFS files 109.

In one example, imported table data may be stored in files in the HDFS (e.g. in Hadoop SEQUENCEFILE format). In practice, except possibly for very small tables, a given source table may be partitioned across multiple files in the HDFS. The files are partitioned by row, each containing the full set of columns imported from the source table (while typically all columns of the source table will be imported this need not always be the case). Additional columns of management data may be added to the imported tables for management purposes during import, for example to record import timestamps and the like. The files are placed in a directory structure, such that the files associated with a single source table preferably reside in a common directory (e.g. with separate directories for each source table, though alternatively files could be spread across multiple directories e.g. depending on whether the tables are partitioned at source).

Apache Hive enables a database structure to be applied to these files, such as tables and columns, and the structure information is stored in the Hive database known as the Hive Metastore. Thus, the term "Hive tables" is used to describe the table structures that are applied across the many files in a HDFS file system. A Hive table is thus a collection of structured HDFS files with each file corresponding to a partition of the source table comprising a subset of the rows of that table. Hive commands (using HQL) are available to access this data and also to update the table structure. HQL provides a similar syntax to SQL.

The data in data repository 110 may be made available to external processes or applications, e.g. analytics application 112 and query builder application 114. Thus, the described approach can enable an organization to bring together information from many disparate databases (possibly supporting different operations of the organization), and analyse and process the data centrally.

When importing data from many different data sources, knowledge of the contents of the data tables and their interrelationships may be lost.

Furthermore, it may often be the case that data imported from disparate data sources is interrelated even though (being from disparate sources) there was no relationship designed into the source databases. For example, a gas or similar utilities provider may import a database of gas supply accounts from a supply part of the organization and a database of boiler maintenance data from a service/maintenance part of the organization. The data may be related in that some supply customers may also be maintenance customers. Thus, there may be relationships between data in the multiple data sources, which may, for example, manifest in overlapping data items appearing in both sets such as customer identifiers or names, addresses, meter or boiler serial numbers and the like. The above is merely one example, and similar relationships may occur between disparate data sources maintained by organization within any field (e.g. medical, banking, manufacturing etc.)

It is not necessarily the case, however, that equivalent or related data from different data sources will reside in tables/columns having the same or related names, and documentation for the source databases may be incomplete or inconsistent, making it difficult to work with the data after import.

Furthermore, even where multiple tables are imported from the same data source, relationships between tables (which may e.g. be defined in the form of metadata, queries, views or the like in the source database) may be lost during the import process. Such relationships typically relate data from one table with data from another. For example, in a "customer" and "order" table, a unique customer identifier used as a primary key in the "customer" table may be used as a foreign key in the "order table" to identify the customer who placed a particular order. This is an example of a relationship that may have been designed into the source database, where it may have been employed e.g. as the basis for table joins in defining queries, views etc. However, knowledge of the relationship may be lost when copying the raw table data into the central data repository. This loss of structural information and knowledge about the data presents a technical problem that impairs subsequent handling and querying of the data.

Embodiments of the present invention address such problems by providing a Relationship Discovery module 120 which can automatically discover relationships between Hive tables stored in the data repository 110. It should be noted, however, that while in the present embodiment the relationship discovery is performed on a set of Hive tables, the same approach could be used with conventional database tables stored in a relational database, or with data structured in any other data representation (e.g. objects in an object database). Thus, the described techniques could be applied to the source databases 102 directly without importing data into repository 110.

The Relationship Discovery module 120 uses examples of known or suspected relationships between specific data values ("seed values") as training samples to search for possible relationships in the data. Discovered relationships may represent e.g. primary-foreign key relationships or any other relationships that may allow a table join operation to be performed to combine data from different source tables. The identified relationships may then be used in the creation of join queries to combine and extract data from the data repository.

Commonly, the relationships identified are of the nature of a primary key to foreign key relationship, i.e. a relationship between a primary key in one table and a corresponding foreign key in another table. Such relationships are commonly used to represent one-to-one and one-to-many entity relationships in relational data schemas (with many-to-many relationships usually modelled using auxiliary mapping tables).

Figure 2:
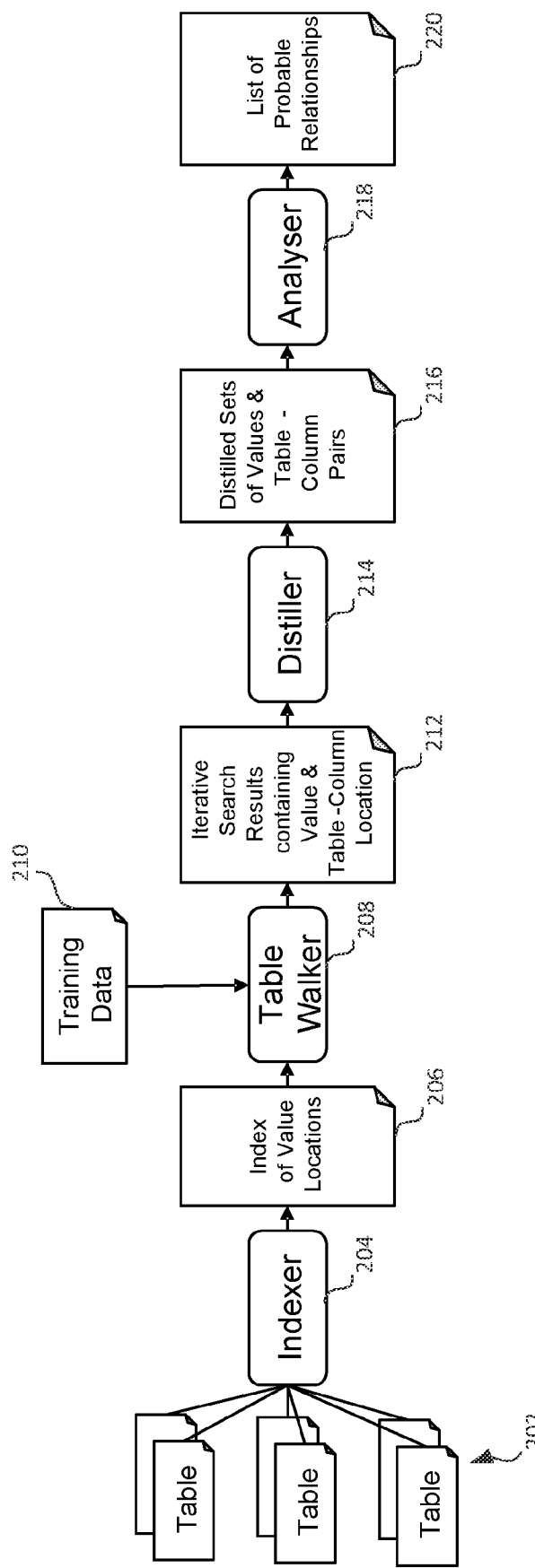
FIG. 2 illustrates the operation and functional components of the relationship discovery module.

The Relationship Discovery module is illustrated in overview in FIG. 2, and comprises the following modules: Indexer 204, Table Walker 208, Distiller 214 and Analyser 218. The operation of the Relationship Discovery module is summarised in outline below.

In a first stage, a set of input tables 202 are indexed by the Indexer 204 (these may e.g. be Hive tables in the data repository 110). This involves creation of an index 206 which maps values appearing in table fields to the table, row and field locations of those table fields.

In a second stage, Table Walker module 208 processes the indexed tables, based on training data 210, to identify common values across tables that might indicate table relationships.

In a third stage, the Distiller 214 compiles sets of values and table-column pairs 216 that may represent relationships between database tables.

In the fourth stage, the Analyser 218 analyses the output of the distiller to identify a set of probable relationships 220. Here, "probable" relationships means those candidate relationships that appear strongly represented in the source data and/or have a high likelihood of representing true relationships in the data.

Indexer

Figure 3:
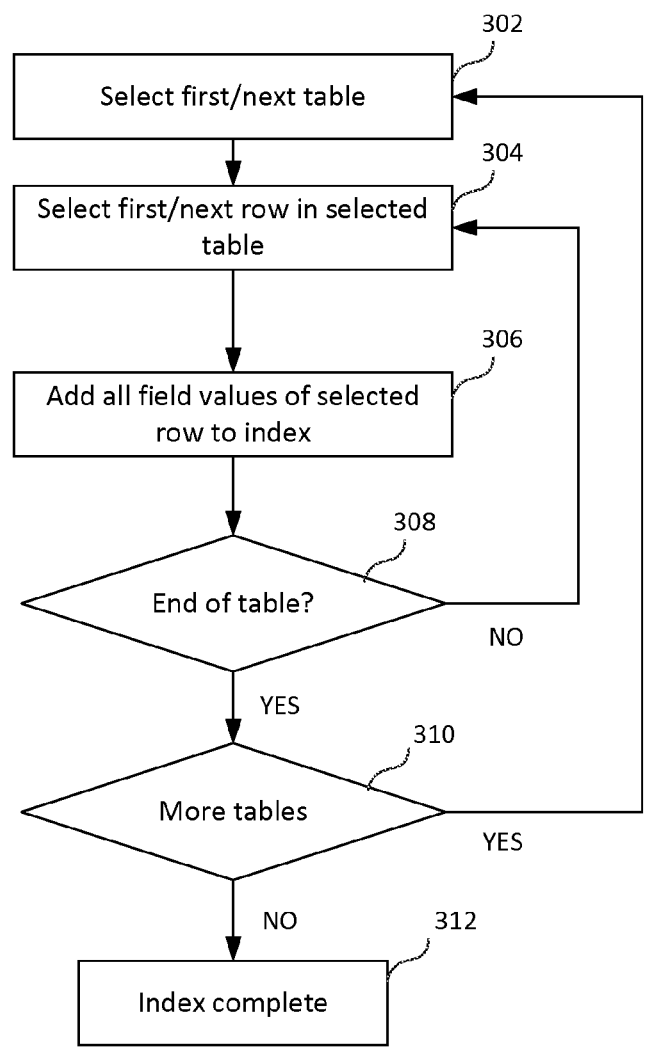
FIG. 3 illustrates an indexing process.

The operation of the Indexer is illustrated further in FIG. 3.

The process starts in step 302 with the selection of a first one of the input tables 202 for processing. In step 304, the first row of the table is selected. In step 306, each value appearing in a field (column) of the selected row is added to the value index. In step 308, the process determines whether any rows remain to be processed in the table. If the end of the table has not been reached, then the next row is processed as before starting at step 304. Otherwise, processing of the table is complete and the process determines whether any further tables remain to be indexed in step 310. If yes, the process continues at step 302 with the next table being selected for processing. Otherwise, the process finishes at step 312 and the index is complete.

After all tables have been processed, the index consists of a set of entries each mapping a distinct field value appearing somewhere in the input records to the table location(s) where the value was found. For example, the index may take the following (abstracted) form:

| Value | Location(s) |
|---|---|
| V1 | (T1, R4, F2), (T1, R8, F2), (T2, R3, F4) |
| V2 | (T2, R1, F5) |
| V3 | (T1, R5, F3), (T2, R8, F4) |
| ... | ... |

Here the "Value" column of the index lists the values found in fields of the input tables (represented by the example values "V1", "V2", "V3"), and the "Location(s)" column lists the location or locations where each value was found. Each location is shown as a tuple consisting of a table identifier, row identifier and field identifier; for example, "V2" was found in a single location, which is table "T2", in row "R1" and field/column "F5". Values "V1" and "V3" were each found in multiple locations. In practice, the locations may of course be represented using actual table names, field names, and row identifiers as used by the database or in any other appropriate way. The index is preferably ordered (e.g. alphabetically/numerically) and may be represented using a B-tree or other known indexing structure for access efficiency.

Relationship Discovery

Figure 4:
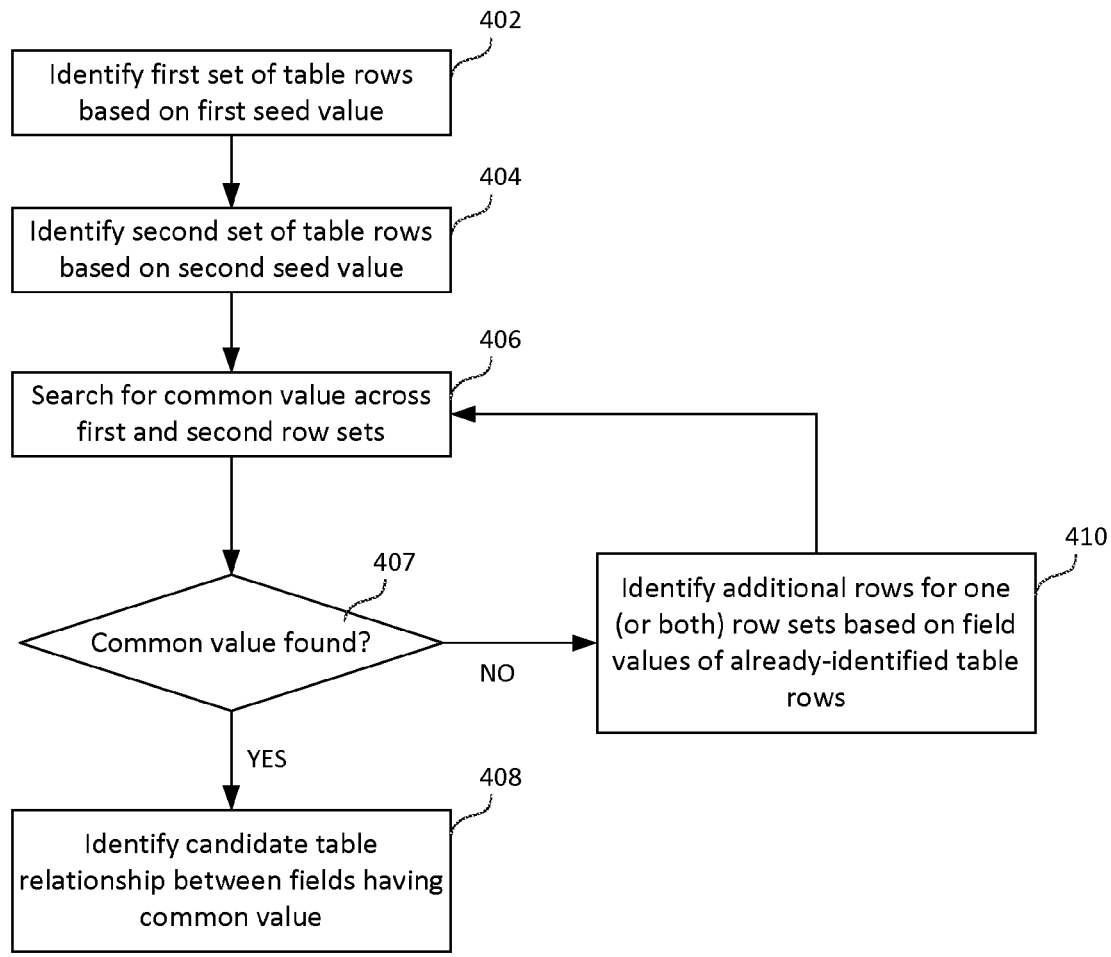
FIG. 4 illustrates the relationship discovery process in overview.

FIG. 4 provides a broad overview of the operation of the Table Walker process 208. The Table Walker process uses the value index generated by the Indexer as input, along with training data 210.

The training data 210 includes training samples on the basis of which a search of the database tables is performed. Each training sample comprises at least two seed values that might be expected to appear in the tables, typically based on some prior knowledge or suspicion that the seed values are in some way related to each other.

FIG. 4 illustrates the processing performed for a single training sample, assuming the training sample comprises two seed values. In step 402, the process identifies a first set of table rows based on the first seed value of the training sample. The set of identified rows initially comprises those rows, taken from any of the input tables, which include the first seed value (in any of the fields of the row). The rows are identified by looking up the seed value in the value index created by the Indexer. The process retrieves the full contents (i.e. all the field values) of each identified row.

In step 404 the process identifies a second set of table rows based on the second seed value of the training sample, in the same manner as described for step 402, i.e. by looking up the second seed value in the value index to identify and retrieve rows in any of the input tables that include the second seed value.

In step 406, the process searches for any common values across the identified sets of table rows. A common value is a value that appears in any field of a row of the first row set and also in any field of a row of the second row set.

Thus, in searching for common values, the process considers all values appearing in the identified rows (not just the seed values). However, in preferred embodiments, as the aim is to identify relationships between different tables, the search may consider only values that are common to rows from different tables—i.e. a common value is then a value that appears in a field of a row of a first table (from the first row set), and also in a field of a row of a second table (from the second row set) that is different from the first table. Other embodiments may remove this restriction (e.g. if relationships within a single table are to be identified).

Assuming at least one common value is found (407), then in step 408 a candidate relationship between the tables and fields where the common value appears is identified in step 408 (if there are multiple common values then multiple such relationships may be identified). If no common values are found across the row sets, then one of the row sets (or both) is (are) expanded in step 410. The expansion involves identifying additional rows based on other field values that appear in the already-identified rows (i.e. values other than the seed values). In essence, the other field values from the identified rows are used as additional seed values, and further table rows are retrieved using the value index. Those further rows are added to the row set being expanded. The expansion is described in more detail below.

The process then continues at step 406, to search for common values using the expanded row set. The expansion in step 410 may be repeated as long as no common values are found or the process may terminate when some termination criterion is met, for example after a set number of iterations.

Figure 5A:
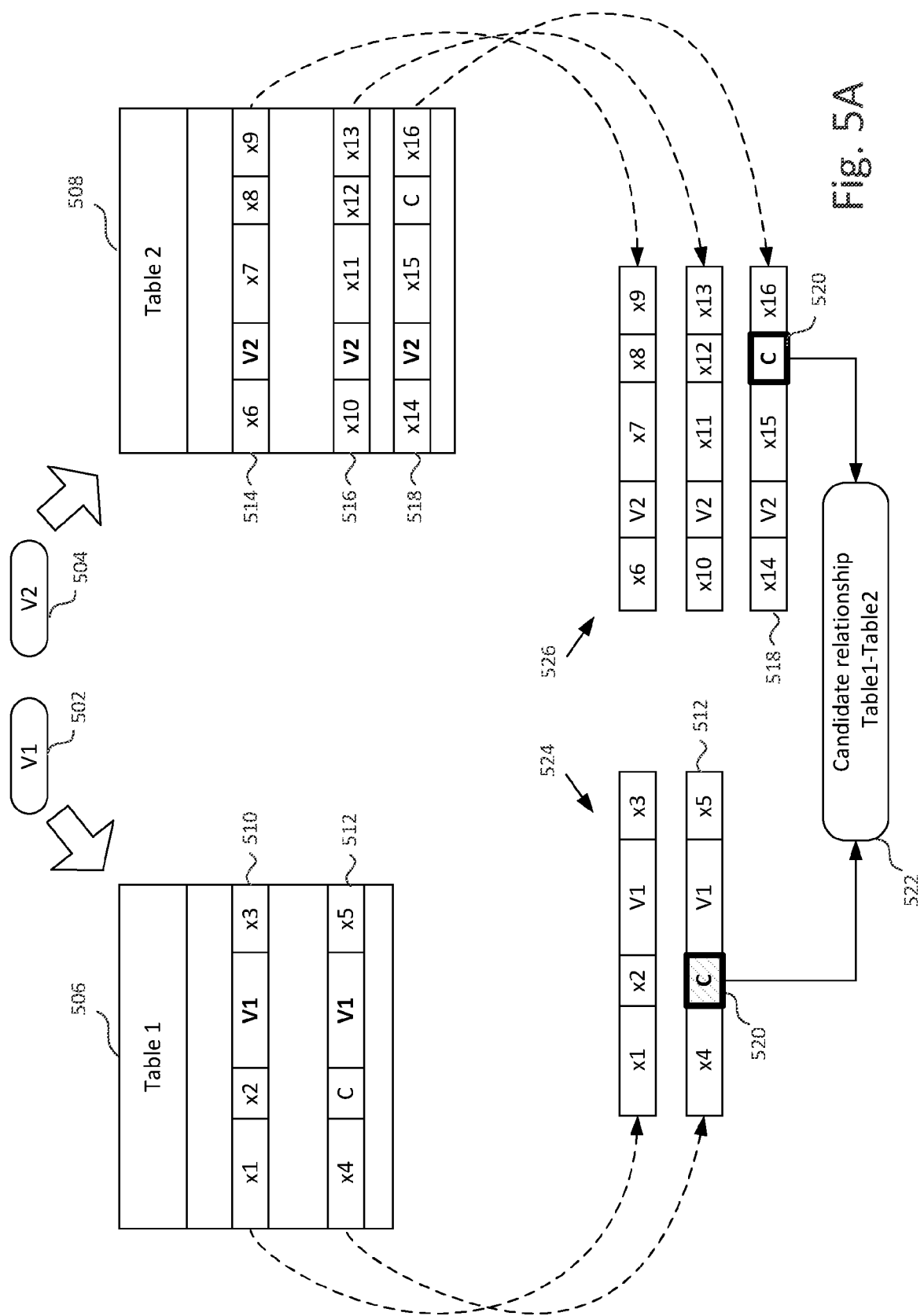
FIG. 5A provides an illustration of a search process performed by the relationship discovery module.

FIG. 5 illustrates an example of the process in operation. In this simplified example, the seed values are value "V1" (502) and "V2" (504) and the tables being searched include "Table 1" (506) and "Table 2" (508). In practice the search may involve any number of seed values and any number of tables, but a simpler example is used here for the sake of clarity.

In this example, the process searches for appearances of "V1" using the value index and finds that value "V1" appears twice in Table 1: in rows 510 and 512. The process also searches for appearances of "V2" using the value index and finds that value "V2" appears three times in Table 2: in rows 514, 516 and 518.

Thus, the search produces two row sets: row set 524 includes rows 510 and 512 for seed value "V1" and row set 526 includes rows 514, 516, 518 for value "V2". The full contents of these rows are retrieved. The process then searches for any overlap in values from the first row set (containing values V1, x1, x2, x3, x4, C, and x5) in the second row set (containing values V2, x6, x7, x8, x9, x10, x11, x12, x13, x14, x15, C and x16). The process here identifies a single common value, which is value "C" (520), which appears in the second field of row 512 and in the fourth field of row 518. This common value represents a candidate relationship 522 between the relevant fields of Table 1 and Table 2 that could be indicative of a relationship existing between the tables (though alternatively it could be coincidental). The system records the candidate relationship 522 (e.g. by adding it to a list of such candidate relationships), with the candidate relationship specifying the source table/column and destination table/column of the relationship and the common value used to identify the candidate relationship. For example, the system may maintain a candidate relationship table of the following form:

TABLE 1

| Source Table | Source column | Target table | Target column | Common value |
|---|---|---|---|---|
| T2 | F3 | T5 | F1 | X |
| T3 | F1 | T6 | F2 | Y |
| T1 | F2 | T2 | F4 | C |
| ... | ... | | | |

If no common values are found, then the row sets are expanded by looking for other rows that include values appearing in the already identified rows. For computational efficiency, the expansion may proceed in stages: first, the row set found for the first seed value is expanded. In the present case this involves using all other values appearing in the first row set as additional seed values (e.g. x1, x2, x3, x4, x5 and C, if it were now assumed that C was not in fact found as a common value in the other row set). All rows in any of the source tables where those values appear are identified using the value index, and the rows are added to the first row set. The search for common values between the (expanded) first row set and the second row set is then repeated. If a common value is found a candidate relationship is identified and the process ends.

If not, then the process continues by expanding the second row set 526. Again, this involves looking up the distinct values appearing in the second row set (e.g. x6, x7 etc.) in the value index and retrieving any rows from the input tables in which those values appear, adding them to the second row set.

If necessary, the expansion can continue in further iterations, expanding the first row set and second row set alternately, either until a common value is found or some termination criterion is met. For example, a maximum number of iterations may be defined with the search ending once the maximum number is reached.

Figure 5B:
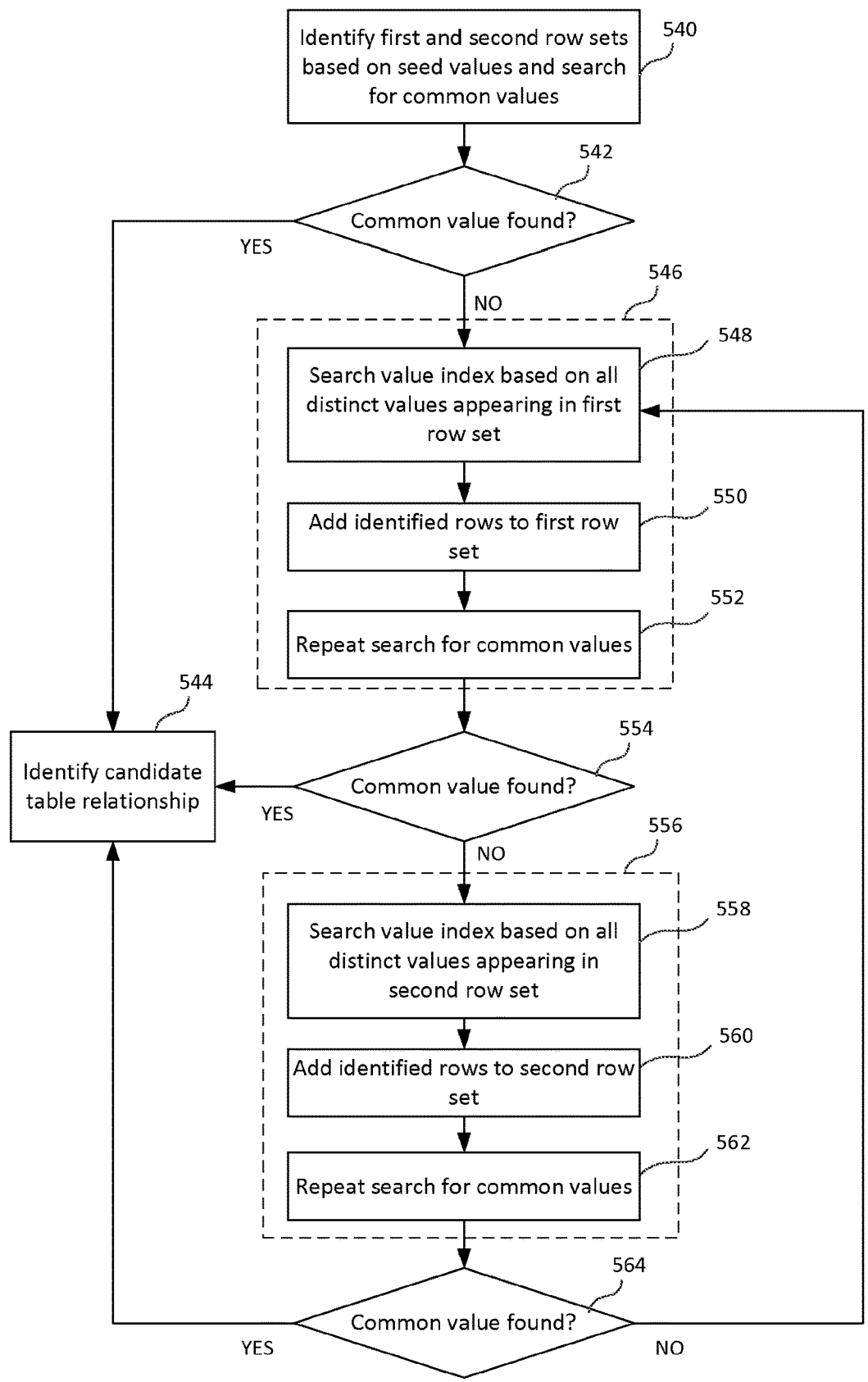
FIG. 5B illustrates iterative expansion of row sets during the relationship search.

The iterative expansion is illustrated in FIG. 5B. In step 540, the first and second row sets are identified and the initial search for common values is performed, as described above (e.g. with reference to steps 402-406 of FIG. 4). If a common value is found (decision 542), the process ends and a candidate relationship is identified at step 544. If no common value is found, then the first of the row sets is expanded in sub-process 546. This involves searching the value index in step 548 using all distinct values appearing in the first row set (excluding the seed value since any rows with that value are already included). All rows identified from the value index are added to the first row set in step 550. The search for common values is then repeated in step 552, comparing the expanded first row set with the original second row set. Note that in this case only the added rows need to be considered since the other rows have already been compared to the second row set. If this search reveals a common value the process ends at step 544 as before.

If no common value is found then the second of the row sets is expanded in sub-process 556, in the same manner as for sub-process 546. Thus, in step 558, all distinct values in the second row set (except seed value) are looked up in the value index and the identified rows are added to the second row set (560). The search for common values is then repeated in step 562, this time comparing the expanded first row set to the expanded second row set. Again, only the newly added rows of the second row set need to be compared (the original rows of the set having already been compared in previous stages); however, these are compared to the full expanded first row set (i.e. to both the initial rows and the rows added when expanding the first row set in sub-process 546). Again, if a common value is found the process ends at step 544 as before.

If a common value has still not been found, the process may be repeated, by returning to sub-process 546 to again expand the first row set, repeat the common value search, and if necessary expand the second row set. Subsequent expansions may be based only on values in the previously added set of rows (since other values will already have been processed). As a further efficiency, the process may ignore values in the previously added rows that were already considered in the rows of earlier iterations (e.g. by keeping track of all distinct values used in previous expansions and expanding only on newly identified distinct values). In each common value search, newly added rows from one row set are compared to the complete expanded row set of the other row set.

The expansion loop with sub-processes 546 and 556 may be repeated until a common value representing a potential candidate relationship is found or until some termination criterion is met, e.g. a maximum number of iterations (in an example embodiment, the maximum is set at three iterations). The process may also be terminated if the expansion identifies no additional rows or based on some other criterion.

While in the above examples, the process alternates between expanding the first row 524 set and second row set 526, to reduce the searching involved at each stage, the process could alternatively expand both sets before repeating the search for common values. If at any stage multiple common values are identified, multiple candidate relationships may be recorded.

The following summarises the process, including expansion, in accordance with a specific embodiment:
1. For first seed value V1, identify all table rows R1 where V1 appears
2. Do the same for second seed value V2 to identify rows R2 where V2 appears
3. Identify any overlapping values between the R1 row set and the R2 row set
4. If found, then candidate relationship exists between those fields containing the overlapping values
5. If none found then expand R1 by, for each row in R1:
   a. Identifying for each value of that row, all other rows where that value appears (resulting in a set of related rows R1')
6. Search for common values between R1' and R2
7. If no common value found, repeat expansion for second row set R2—i.e. for each row in R2:
   a. Identify for each value of that row, all other rows where that value appears (resulting in a set of related rows R2')
8. Search for common values between R1+R1' and R2'
9. If no common value found, repeat expansion and common value search for R1' and R2' in turn, until common value found or maximum number of iterations reached.

The iterative expansion of row sets allows potential relationships to be identified even where the seed values do not appear in directly linked table rows. An illustrative example of this will be given below.

The Table Walker outputs the list of candidate relationships found during the search (e.g. this may be output as a text/comma-separated-value (CSV) file, or stored as a Hive table in repository 110). The list indicates for each candidate relationship the table/column of the source table of the candidate relationship, the table/column of the target table of the candidate relationship, and the common value found at those locations (e.g. as shown in Table 1).

EXAMPLES

A concrete example of the operation of the algorithm using sample data is illustrated in FIGS. 6A-6C.

In these examples it is assumed that the database includes customer and order information for an organization, including tables such as a "Customer" table listing customer details, and "Address" table listing customer addresses, an "Order" table listing product orders placed by customers, a "Bill" table listing billing data, and the like. In this example, it is further assumed that there is prior knowledge that a customer with name "Daljit" has in the past ordered a product identified by the keyword "Shoe". This prior knowledge may e.g. have been obtained from an invoice, during a customer enquiry, from email correspondence, or in any other way. The relationship discovery process is thus carried out using the values "Daljit" and "Shoe" as seed values.

FIG. 6A illustrates the value locations obtained from the value index for each value. FIG. 6B shows the full rows corresponding to the identified locations. FIG. 6C shows a (partial) listing of all the values appearing in the respective row sets for the different seed values. The algorithm compares the value sets and identifies that the value "CustKEY1" appears in location (T1, C1, R1) and also in (T3, C2, R7). This suggests a candidate relationship between table T1 column C1 and table T3 column C2.

In this example, the identified table relationship can be considered to be between "adjacent" tables since the seed values are linked by a single common field value from the source table to the destination table.

FIG. 7A illustrates application of the algorithm to identify relationships in non-adjacent tables, i.e. where the seed values still reveal a relationship, but the relationship is not between the two tables in which the seed values appear. These relationships are identified using the iterative expansion technique described earlier.

FIG. 7A shows contents of four tables, "Customer", "Address", "Order" and "Bill". In this case, the seed values used for relationship discovery are "London" and "Shoe". As described previously, the first step is the identification of the set of rows in which "London" appears (first two rows in the "Address" table). The second step is the identification of rows in which "Shoe" appears (seventh row in the "Order" table). However, those rows do not have any value in common. However, by expanding the row sets as described above (e.g. initially, the "London" rows may be expanded), rows in a third table are found ("Customer" table) that are linked to the "Address" table rows.

Specifically, in this case, expanding the two "Address" table rows in which initial seed value "London" appears will result in the algorithm looking for additional rows containing values such as "AddrKEY1", "Gassy Cottage", "Swamp Road", "AddrKey2", "Sparky Villa" etc. This will result in the algorithm finding the first two rows of the "Customer" table, which also contain values "AddrKEY1" and "AddrKEY2". Those rows are therefore added to the first row set. Finally, the common value search reveals a common value ("CustKEY1") which appears in one of those additional rows and also in the original row retrieved from "Order" table based on the "Shoe" seed value. This therefore implies a potential relationship 700 between Column 1 of the "Customer" table and Column 2 of the "Order" table. For example, this could take the form of a unique customer identifier that appears as a primary key in the "Customer" table and as a foreign key in the "Order" table.

Thus the algorithm can be considered as searching for a path connecting a row containing the first seed value to a row containing the second seed value. By way of the row expansion, that path may extend across multiple tables, so as to reveal relationships other than between the immediate pair of tables containing the seed values.

In the above example, the Table Walker would thus add a candidate relationship of the following form to its output:

TABLE 2

| Source Table | Source column | Target table | Target column | Common value |
|---|---|---|---|---|
| Customer | Column 1 | Order | Column 2 | "CustKEY1" |

Note that the terms "source" and "target" are used as labels and have no particular significance since the relationship is symmetric and thus the "source" and "target" could be swapped.

In one embodiment, this may be the only relationship added in response to identifying the common value. However, in an alternative embodiment, additional candidate relationships identified along the path between the seed values may also be added. In this case, the expansion of the rows from the "Address" table retrieved the first two rows of the "Customer" table based on values "AddrKEY1" and "AddrKEY2". These may also indicate potential relationships between tables. Thus, in this embodiment, the following additional candidate relationships would be added to the output:

TABLE 3

| Source Table | Source column | Target table | Target column | Common value |
|---|---|---|---|---|
| Customer | Column 1 | Order | Column 2 | "CustKEY1" |
| Address | Column 1 | Customer | Column 5 | "AddrKEY1" |
| Address | Column 1 | Customer | Column 5 | "AddrKEY2" |

Such additional relationships may be recorded only if a common value is ultimately found. Alternatively, these candidate relationships found during the row expansions may be added to the output even if the search is aborted without a common value being found. As shown in Table 3, in the initial stage of processing, multiple instances of the same candidate relationship (same table/column pairing) are recorded separately in the output of the Table Walker.

While in the above examples, two seed values are used per training sample, this can in principle be extended to any number of seed values. In that case, row sets are generated for each training sample and the search for common values is performed across all row sets. As described above, each row set may be expanded in turn and the search repeated if the search reveals no common value.

Analysing Identified Relationships

The Table Walker process is repeated for each training sample of the training data, where each training sample corresponds to two (or more) seed values. For example, these processes may run in parallel, e.g. with parallel Table Walker instances operating on different training samples.

This produces a set of zero or more candidate relationships (source table/column, target table/column, common value) for each training sample.

The Distiller processes the Table Walker output to count up all repeated occurrences of the same candidate table relationship (where relationships are "the same", i.e. not distinct, if defined between the same source/destination table/column pairings) and outputs a summarised list of relationships. For example, for the Table Walker output shown in Table 3, the following output could be generated:

TABLE 4

| Source Table | Source column | Target table | Target column | Occurrence count |
|---|---|---|---|---|
| Customer | Column 1 | Order | Column 2 | 1 |
| Address | Column 1 | Customer | Column 5 | 2 |

Of course the output would typically be based on a large set of training samples and would contain many candidate relationships. The Distiller again generates the output as a text/CSV file (or could alternatively write its output to a Hive table in the repository or output it in some other way).

The Analyser aggregates and applies weightings to the candidate relationships and proposes the most likely relationships (i.e. those most likely to define actual table joins). The output of the Analyser may again be stored in the form of text/CSV files, and additionally may be provided as on-screen output, e.g. in the form of visualisations of joins/relationships.

In more detail, the Analyser module 218 processes the output of the Distiller process to identify which of the identified potential relationships are likely to represent actual table relationships. In one embodiment, the analyser determines a measure of the probability that an identified candidate relationship corresponds to an actual table relationship based on the number of times that particular candidate relationship was observed compared to the total number of training samples processed. For example, the probability may be computed as the number of occurrences of the candidate relationship between a given column pair (e.g. T1C1-T2C2), divided by the number of training samples. Thus, a candidate relationship found for most or all training samples may indicate a high likelihood that the candidate relationship represents a genuine table relationship between the table/column pair, whilst a candidate relationship found for only one or a few training samples may indicate a low likelihood that the candidate relationship represents a genuine table relationship.

The output of the Analyser may e.g. take the following form:

Total training samples processed: 10

TABLE 5

| Candidate relationship | Occurrences | Relationship Probability/Strength |
|---|---|---|
| T1C1-T2C2 | 3 | 3/10 = 30% |
| T1C5-T3C1 | 9 | 9/10 = 90% |
| T2C4-T4C2 | 1 | 1/10 = 10% |
| T3C1-T4C6 | 10 | 10/10 = 100% |

Other approaches may of course be used to determine a value indicative of the probability, strength or quality of an identified relationship. For example, a weighting could be applied to increase the likelihood measure for high occurrence links and reduce the likelihood measure for low occurrence links. As another example, occurrences below a threshold (e.g. an absolute threshold such as one or two occurrences, or a relative threshold such as 5% of training samples) could be eliminated from the results altogether or have their relationship measure set to 0, to remove cases where candidate relationships may be due to coincidental matching values across table columns.

Instead of providing the separate Distiller process for counting the number of occurrences of each distinct table/column relationship in the Table Walker output, counts for distinct relationships could be accumulated by the Table Walker during the processing of training samples. However, separating these steps into separate processes allows more efficient parallelized implementation, e.g. in a map-reduce algorithm.

The Analyser then outputs the candidate relationships with their associated measures of strength/likelihood. In some embodiments, the Analyser may select only those relationships that meet particular criteria for output as a final set of "probable" relationships. For example, the Analyser may select relationships with a likelihood exceeding a predetermined threshold, or may select the best N (e.g. top 5) identified relationships according to the computed metric for output and further processing.

In an embodiment, the algorithm may be adapted to distinguish between the case where a given candidate relationship is found multiple times based on the same common value or based on multiple distinct common values. This is illustrated in FIGS. 7B-7C. Here, FIG. 7B shows an example where a particular distinct candidate relationship (between "Delivery postcode" in "Order Table" and "Postcode" in "Address Table") is identified three times based on three distinct common values ("SW19 5BR", "RG21 4PX", "TN7 0GR"). FIG. 7C shows an example where that same candidate relationship is identified three times but based on the same common value ("SW19 5BR" in each case).

In this embodiment, the distiller initially generates counts for each unique combination of candidate relationship and common value. The Analyser can then aggregate the counts for different values to generate a total count for each relationship. In doing so the Analyser may, for example, score multiple occurrences of the same candidate relationship with the same common value as a single relevant occurrence of the relationship (thus in the FIG. 7C example the three occurrences would count only once) or may score each occurrence separately (in which case the FIG. 7C example would count as three occurrences of that relationship). Which approach is used may be configurable.

More generally, the system may identify either or both the number of occurrences of the candidate relationship (e.g. the number of times it appears in the Table Walker output) and the number of distinct values in the common values used to identify multiple occurrences of the candidate relationship. Either or both value(s) may be used to determine the strength/probability of a given relationship (this may be configurable), e.g. as a ratio of one of the values to total number of training samples.

Different and/or more complex approaches could be used, e.g. aggregating relationship occurrences using weightings such that repeated occurrences of a relationship with distinct common values contribute more to the final score than repeated occurrences using the same common value. In this example, the system could weight the FIG. 7B example (three matches based on three distinct values) more highly than the FIG. 7C example (three matches based on one distinct value).

Applications

The identified relationships may be utilised in various ways, including in the design and execution of queries (described further below). A visualisation tool may also be provided for visualising the identified relationships (e.g. with the strength or likelihood indicated using the calculated likelihood measure). For example, such a tool could visualise an inferred schema including the tables and selected ones of the relationships (e.g. using the strongest identified relationships). A further example is the use of the relationship discovery for data schema diagnostics, is described in the next section.

Data Schema Diagnostics

Referring back to FIG. 1, in this application of the relationship discovery algorithm, it is assumed that the algorithm is applied to an existing database 102-3 supporting an operational data processing system 104. As before the database is copied into the data repository by Data Tap module 106.

It is assumed that the data schema of the database is not known a priori—thus, it may initially be unknown how the data is structured into tables and table columns, or how tables are related to each other.

The basic table structures (i.e. tables, columns, data types) may be identified by the Data Tap module 106 during import of the tables (e.g. by reading from the system tables in the source database, using a database API etc.) However, while this will reveal basic structure, it will not directly reveal the function or meaning of individual tables/columns. Furthermore, data relationships are generally not discoverable in this way.

In an embodiment, the system uses known sample data (essentially dummy data) as a "probe" to probe the schema of the database, by inserting the sample data into the source database 102-3 using the data processing system 104.

The sample data is inserted using the conventional data input methods provided by the data processing system 104. For example, system 104 may include a set of data entry user interfaces through which operators (in normal use) enter new data records into the system. However, the data schema used to store such data is often much more complex than (and not directly derivable from) the structure of the user interfaces.

In the present embodiment, sample data is entered via the user interfaces of system 104, either manually, or preferably in an automated fashion, e.g. using scripts. Instead of inputting the sample data via user interfaces, the data processing system 104 may provide automated data ingestion mechanisms (e.g. file import tools, APIs etc.) in which case the sample data can alternatively be inserted using those mechanisms in an automated fashion. The sample data can be any data with known values—possibly chosen as unusual/uncommon values to allow the data to be more easily distinguished in the imported tables—and could e.g. be (pseudo) randomly generated.

After the sample data has been input to data processing system 104, data processing system 104 will store the data, using the unknown data schema, in database 102-3.

Data Tap module 106 is then run to import the tables from database 102-3 into the data repository 110. Subsequently, the Relationship Discovery tool 120 is run to identify possible relationships in the data. In doing so, the Relationship Discovery tool uses data from the sample data as the training samples. This allows the system to identify how the entered data is reflected in relationships between data tables in the database.

For example, a name ("John Smith") and address ("Main Street, Newtown") of an individual may be entered as sample data into a single input screen of the data processing system 104. The database may store this data in multiple interrelated tables, for example a customer table with first name, surname and customer ID (primary key) fields and an address table with street, town, country fields etc., with the address table additionally using the customer ID as a foreign key to the customer table. This relationship would be unknown since the original data schema of the database is unknown. However, by running the previously described Relationship Discovery algorithm using selected values of the sample data as seed values, the relationship can be discovered. In this example, "Smith" and "Newtown" could be used as the two seed values forming a training sample. Of course, as previously described, the process may be repeated using multiple training samples based on the sample data, in order to obtain more information and greater confidence in the identified relationships.

A visualisation tool may be provided to visualise the possible relationships. Actual data contents may also be displayed to allow an operator to infer the likely functions of particular tables/rows. In one implementation, the tool may make this task easier by searching for occurrences of the specific sample data that was entered and displaying the specific tables/table rows containing that data, together with identified relationships and possibly indications of relationship strength based on the computed likelihood measures.

This information can then be used by the operator e.g. to define a schema for the data, create and run queries to extract useful data etc. The operator may also choose to insert additional sample data into the source database via system 104 and rerun import/relationship discovery, for example to resolve specific questions or ambiguities concerning the data schema. In this way, the system may be used in an iterative fashion to probe the structure of the initially unknown data schema.

The described approaches can be particularly beneficial when attempting to utilise data managed by legacy systems, where details of data schema and relationships are manifested in the code, database queries etc. that form part of the implementation of the legacy system, but where those implementation details are not directly available.

A similar diagnostic approach can be used e.g. to identify inefficient structures in the database (e.g. unnecessary duplication of data, indirect data referencing etc.), to support database redesign, for example to enable more efficient data querying.

Query Builder

Referring back to FIG. 1, embodiments may additionally provide a Query Builder application 114, which enables a user to construct queries using the discovered relationships.

Figure 8A:
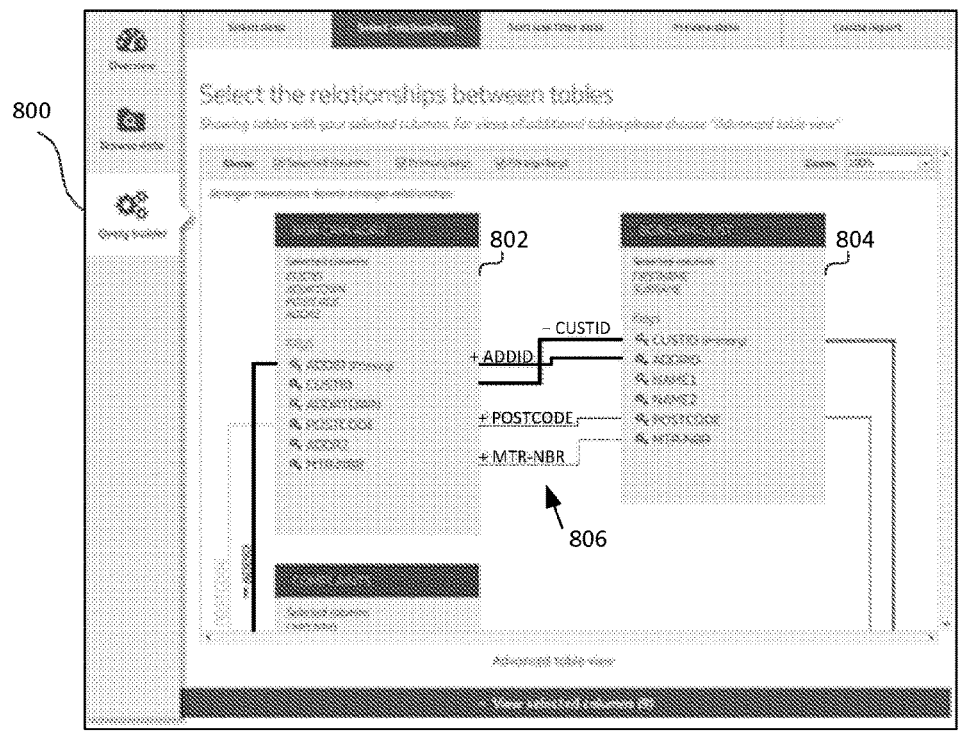
FIGS. 8A-8B illustrate an interface for a query builder tool that uses discovered relationships in the creation of data queries.
Figure 8B:
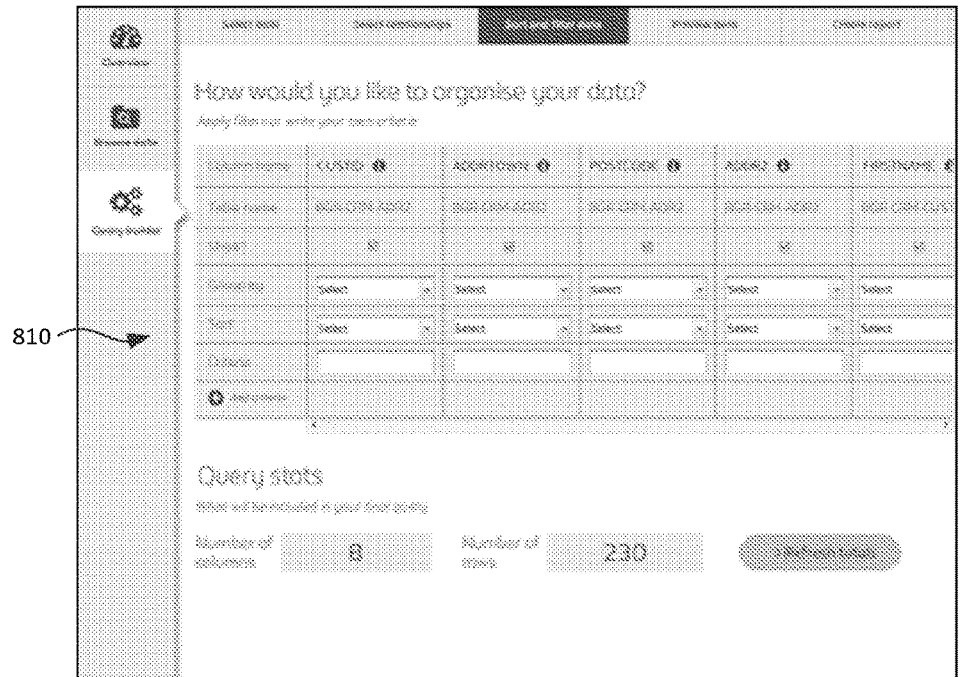

An example user interface of the Query Builder application is depicted in FIGS. 8A and 8B. FIG. 8A illustrates an interface 800 of the Query Builder displaying two tables 802 and 804 selected for the query by the user. These tables may have originated from different data sources and thus the relationships between the tables may not be known a priori. The interface also proposes a number of possible relationships 806 between the tables which have previously been discovered by the Relationship Discovery module (illustrated as labelled lines connecting the respective column/field names of the respective tables). A visual indication of the relationship strength (based on the relationship likelihood or other metric computed by the Relationship Discovery module as described above) is provided by way of the colour and/or line weight used to represent the connections between tables—here a relationship between the CUSTID column of table 802 and the CUSTID column of table 804 is identified as the strongest relationship. The user may be able to view more detailed relationship information for each relationship (e.g. by clicking on or hovering over a relationship in the interface).

Instead of proposing previously discovered relationships, the Relationship Discovery module could be invoked on-demand by the Query Builder, in response to the user identifying the tables for the query.

The user then selects the required relationship e.g. by clicking on the link or label. At that point the Query Builder generates an initial query definition including a table join based on the specified relationship and a second screen 810 (FIG. 8B) may then be displayed to allow the user to specify additional parameters of the query, such as which columns to include in the query output, the query criteria, and any grouping/aggregation/sorting to be performed.

After defining the query the query can then be executed to retrieve data from the data repository 110. In preferred embodiments, based on the user input a query statement or script is generated in accordance with an appropriate data query language, e.g. HQL or SQL. The generated query includes a table join based on the selected relationship, i.e. with a join defined on the table columns to which the relationship relates (this may be done e.g. by adding a WHERE statement or similar, such as "WHERE T1.A=T2.B" to define a join condition between table 1 column A and table 2 column B). The join type (e.g. inner/outer and left/right/full join etc.) may be specified by the user or a default join type may be used.

The query is then executed, e.g. in the case of the Hadoop system by submitting the generated HQL statement to Hive. Hive executes the query and returns the results to Query Builder or other relevant component (e.g. data analytics application 112). The query results may also be transmitted to a user device (e.g. PC terminal or mobile device) for display to the user, stored as a new table in the data repository 110, or transmitted to a remote computer system for further processing.

In addition to direct execution the query can be saved in the system and if appropriate published to make it available for other users.

While FIGS. 8A-8B illustrate a relatively simple query with two tables, more complex queries may be constructed including more than two source tables and/or multiple join relationships. Queries may also be combined by nesting (e.g. by using query output from one query as input to another query in place of a source table).

System Architecture

Figure 9:
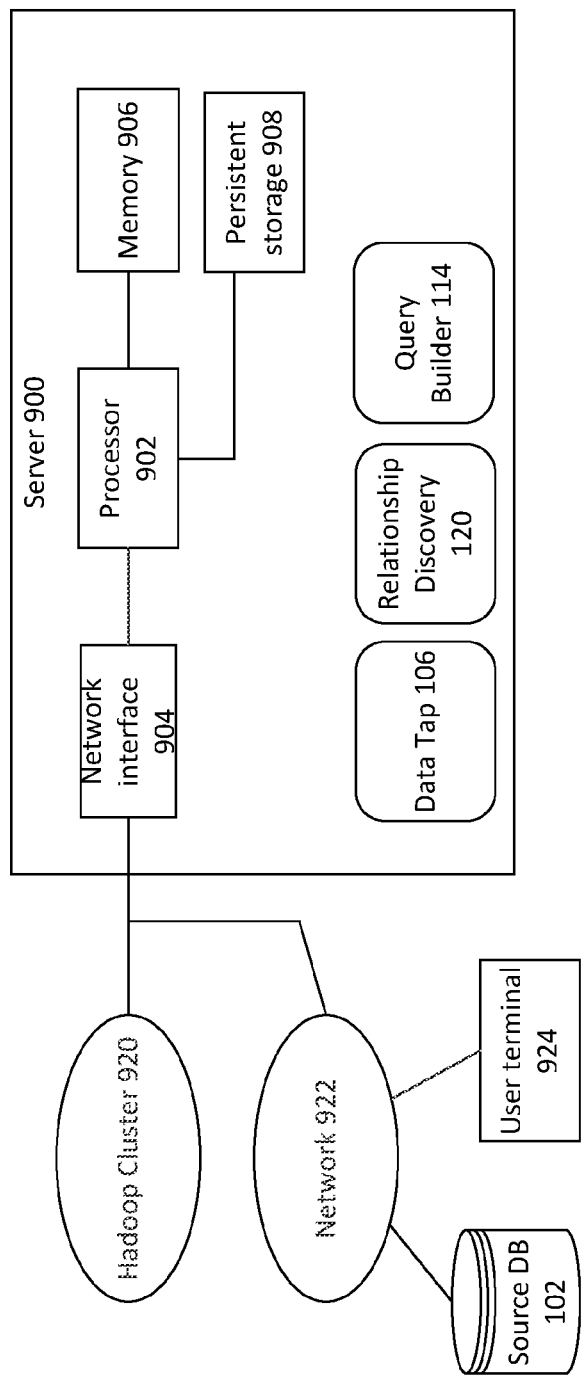
FIG. 9 illustrates a hardware/software architecture of a server device on which various described processes or modules may be implemented.

FIG. 9 illustrates an example of a hardware/software architecture of a server node 800 which may be used to implement methods and techniques described herein. The server includes one or more processors 902 together with volatile/random access memory 906 for storing temporary data and software code being executed.

A network interface 904 is provided for communication with other system components (e.g. other servers in a Hadoop cluster 920, where the server 900 is operating as part of a cluster) and a wider network 922 (e.g. Local and/or Wide Area Networks, including the Internet), for example, for connection to data sources 102, user terminals 924 and other devices.

Persistent storage 908 (e.g. in the form of hard disk storage, optical storage, solid state storage and the like) persistently stores software for performing the various functions, including one or more of: the Data Tap module 106 for importing data from data sources 102 into the data repository 110, Relationship Discovery module 120 for identifying table relationships using the methods set out above, and Query Builder module 114 to enable creation and execution of queries based on the identified relationships.

The persistent storage also includes other server software and data (not shown), such as a server operating system. The server will include other conventional hardware and software components as known to those skilled in the art, and the components are interconnected by a data bus (this may in practice consist of several distinct buses such as a memory bus and I/O bus).

A user may interact with the server from a user terminal 924 (e.g. a PC terminal or mobile computing device). For example, user interfaces (UI) for the Data Tap, Relationship Discovery and/or Query Builder modules may be provided as web applications remotely accessible from user terminal 924.

While a specific software and hardware architecture is shown in FIG. 9 by way of example, any appropriate hardware/software architecture may be employed and any suitable hardware, database, API and UI technologies may be used.

Furthermore, functional components indicated as separate may be combined and vice versa. While in this example, a range of different processes 106, 120 and 114 are shown as implemented on the server, in practice these processes may be distributed across multiple servers, e.g. with different servers handling data import, table analysis and query design/execution functions. Furthermore, individual processes such as Data Tap and the Relationship Discovery algorithm may be implemented in parallelized form across multiple processing nodes. More generally, functionality may be distributed over any number of computing devices in any suitable manner.

In preferred embodiments, where appropriate, modules may operate in a parallelized fashion (e.g. using Hadoop map-reduce) across multiple physical or virtual servers or compute nodes in a Hadoop cluster.

The data repository 110 (FIG. 1) may be implemented as persistent storage distributed over a number of servers in the Hadoop cluster (e.g. in the form of a Hadoop distributed file system). Those servers may provide data storage only or may combine data storage with any of the previously described processing functions.

The Relationship Discovery module 120 may be implemented using a map-reduce algorithm, for example, using the Hadoop Java map-reduce framework. Referring to FIG. 2, the Table Walker could be implemented as a set of parallel "map" tasks (e.g. operating on different training samples), with the distiller and analyser implemented as "reduce" tasks.

It will be understood that the present invention has been described above purely by way of example, and modification of detail can be made within the scope of the invention.

The invention claimed is:

1. A method of identifying relationships between given data collections in a data repository of a plurality of data collections, each data collection comprising a plurality of data records, each data record comprising one or more data fields storing one or more data values, the method comprising performing a search process including:
   receiving a first seed value and a second seed value;
   identifying and retrieving a first set of data records from a first table of the plurality of data collections based on the first seed value, wherein the first set of data records is in the form of raw imported data records;
   identifying and retrieving a second set of data records from a second table of the plurality of data collections based on the second seed value, wherein the second set of data records is in the form of raw imported data records;
   searching for a common value across the retrieved first and second data record sets, wherein the common value is a value which appears in a first data field in a first data record of the first data record set and in a second data field in a second data record of the second data record set, wherein the first data record is from a first data collection and the second data record is from a second data collection;

in response to not identifying the common value when searching using the retrieved records, iteratively expanding one of the first and second record sets using one or more other values appearing in the first or second record set as additional seed values and repeating the search, until the common value is found or until a termination criterion is met, the iteration alternating between expanding the first record set and the second record set, wherein the iteratively expanding the first record set and the second record set includes expanding the first record set to retrieve a first expanded record set and comparing the first expanded record set to the second record set to identify if the common value is found, if the common value is not found, expanding the second record set to retrieve a second expanded record set and comparing the second expanded record set to the first expanded record set to identify if the common value is found, and the iteratively expanding of the retrieved data sets is repeated until the common value is found or until the termination criteria is met;

in response to identifying the common value, outputting an indication identifying a candidate relationship between the first data field of the first data collection and the second data field of the second data collection; and using one or more identified candidate relationships or probable relationships in the creation of a query to retrieve data from the data repository, the query including a join predicate specifying an equivalence or other relationship between the first field and the second field, wherein the expanding step comprises adding one or more data records to either or both of the first and second data record sets, and repeating the search for a common value using the added data records, wherein the search for a common value is repeated using all data records of the given data record set including the added data records and previously identified records.

2. A method according to claim 1, wherein identifying the first data record set comprises identifying one or more data records containing the first seed value; and/or wherein identifying the second data record set comprises identifying one or more data records containing the second seed value;

the method comprising performing the search for a common value using the identified data records.

3. A method according to claim 2, wherein adding data records to a given data record set comprises:

identifying one or more further values, preferably not including the respective first or second seed value, which appear in data records of the given data record set; and selecting one or more data records to be added to the given data record set based on the further value(s);

wherein selecting one or more data records to be added comprises selecting one or more data records from the plurality of data collections that include one of the further values.

4. A method according to claim 3, wherein the identifying step identifies as the further values each distinct value appearing in the given data record set other than the respective seed value, and/or wherein the selecting step selects every data record from the data collections not already included in the data record set that contains any of the identified further values.

5. A method according to claim 2, comprising performing the adding step for the first data record set and repeating the searching step using the added data records, and subsequently, if a common value is not identified, performing the adding step for the second data record set and repeating the searching step using the data records added to the first and second data record sets.

6. A method according to claim 2, wherein the termination criterion specifies a maximum number of iterations.

7. A method according to claim 1, wherein identifying one or more data records based on a seed value or based on a further value comprises performing a lookup of the seed value or further value in a value index, the value index mapping data values appearing in the plurality of data collections to locations where the data values appear, each location preferably comprising a reference to the data collection, data record and data field where a respective data value appears.

8. A method according to claim 7, comprising generating the value index based on the data collections.

9. A method according to claim 1, comprising repeating the search process based on a plurality of training samples, each training sample comprising respective first and second seed values, to produce a plurality of indications of candidate data relationships, each indication indicating a potential relationship between a first data field of a first data collection and a second data field of a second data collection; and analyzing the plurality of indications to identify one or more probable data relationships.

10. A method according to claim 9, comprising identifying a plurality of distinct candidate relationships, wherein a distinct candidate relationship is preferably a relationship between a given first data field of a first data collection and a given second data field of a second data collection, and determining a measure indicative of a strength or likelihood of each distinct candidate relationship based on the analysis, wherein the measure for a candidate relationship is optionally determined in dependence on a number of distinct occurrences of the relationship found during the search process.

11. A method according to claim 10, comprising, for each distinct candidate relationship identified between a first data field of a first data collection and a second data field of a second data collection based on one or more common values, determining one or both of:

a first number, being a number of times the distinct candidate relationship was identified using the search process; and a second number, being a number of distinct values of the common values used to identify multiple instances of the candidate relationship; and determining the measure for the candidate relationship based on the first and/or second number, the measure optionally being determined based on a ratio of the first number or the second number, and a total number of training samples processed.

12. A method according to claim 10, comprising selecting one or more of the distinct candidate relationships as probable relationships based on the respective measures, and outputting information specifying the selected probable relationships; the selecting comprising at least one of:

selecting the one or more relationships in dependence on a comparison of the measure computed for the candidate relationship and a threshold; and selecting a given number of relationships having a highest strength or likelihood according to the computed measures.

13. A method according to claim 1, comprising receiving, by a query design tool, a selection of at least two data collections for a query, and adding a join to the query based on a candidate relationship identified by the search process and/or a candidate relationship selected as a probable relationship.

14. A method according to claim 1, wherein the data collections are associated with a data processing system comprising a data input interface, the method comprising:
   inputting sample data to the data processing system via the data input interface, whereby the data processing system stores the sample data into a source database, and wherein the data collections form part of the source database or are copied from corresponding data collections of the source database; and
   running the search process to identify data relationships based on the sample data, including using values from the sample data as the seed values for the search process.

15. A method according to claim 1, wherein the data collections comprise data tables, optionally in or imported from one or more relational databases, wherein the data records correspond to rows of the tables, and wherein the data fields correspond to columns of the tables.

16. A non-transitory computer-readable medium comprising software code adapted, when executed on a data processing apparatus, to perform a method of identifying relationships between given data collections of a plurality of data collections in a data repository, each data collection comprising a plurality of data records, each data record comprising one or more data fields storing one or more data values, the software code adapted to perform a search process including:
   receiving a first seed value and a second seed value;
   identifying and retrieving a first set of data records from a first table of the plurality of data collections based on the first seed value, wherein the first set of data records is in the form of raw imported data records;
   identifying and retrieving a second set of data records from the plurality of data collections based on the second seed value, wherein the second set of data records is in the form of raw imported data records;
   searching for a common value across the retrieved first and second data record sets, wherein the common value is a value which appears in a first data field in a first data record of the first data record set and in a second data field in a second data record of the second data record set, wherein the first data record is from a first data collection and the second data record is from a second data collection;
   in response to not identifying the common value when searching using the retrieved records, iteratively expanding one of the first and second record sets using one or more other values appearing in the first or second record set as additional seed values and repeating the search, until the common value is found or until a termination criterion is met, the iteration alternating between expanding the first record set and the second record set, wherein the iteratively expanding the first record set and the second record set includes expanding the first record set to retrieve a first expanded record set and comparing the first expanded record set to the second record set to identify if the common value is found, if the common value is not found, expanding the second record set to retrieve a second expanded record set and comparing the second expanded record set to the first expanded record set to identify if the common value is found, and the iteratively expanding of the retrieved data sets is repeated until the common value is found or until the termination criteria is met;
   in response to identifying the common value, outputting an indication identifying a candidate relationship between the first data field of the first data collection and the second data field of the second data collection; and
   using one or more identified candidate relationships or probable relationships in the creation of a query to retrieve data from the data repository, the query including a join predicate specifying an equivalence or other relationship between the first field and the second field,
   wherein the expanding step comprises adding one or more data records to either or both of the first and second data record sets, and repeating the search for a common value using the added data records, wherein the search for a common value is repeated using all data records of the given data record set including the added data records and previously identified records.

* * * * *